J. R. HYDE.
Cooking Stove.
No. 2,688. Reissued July 16, 1867.
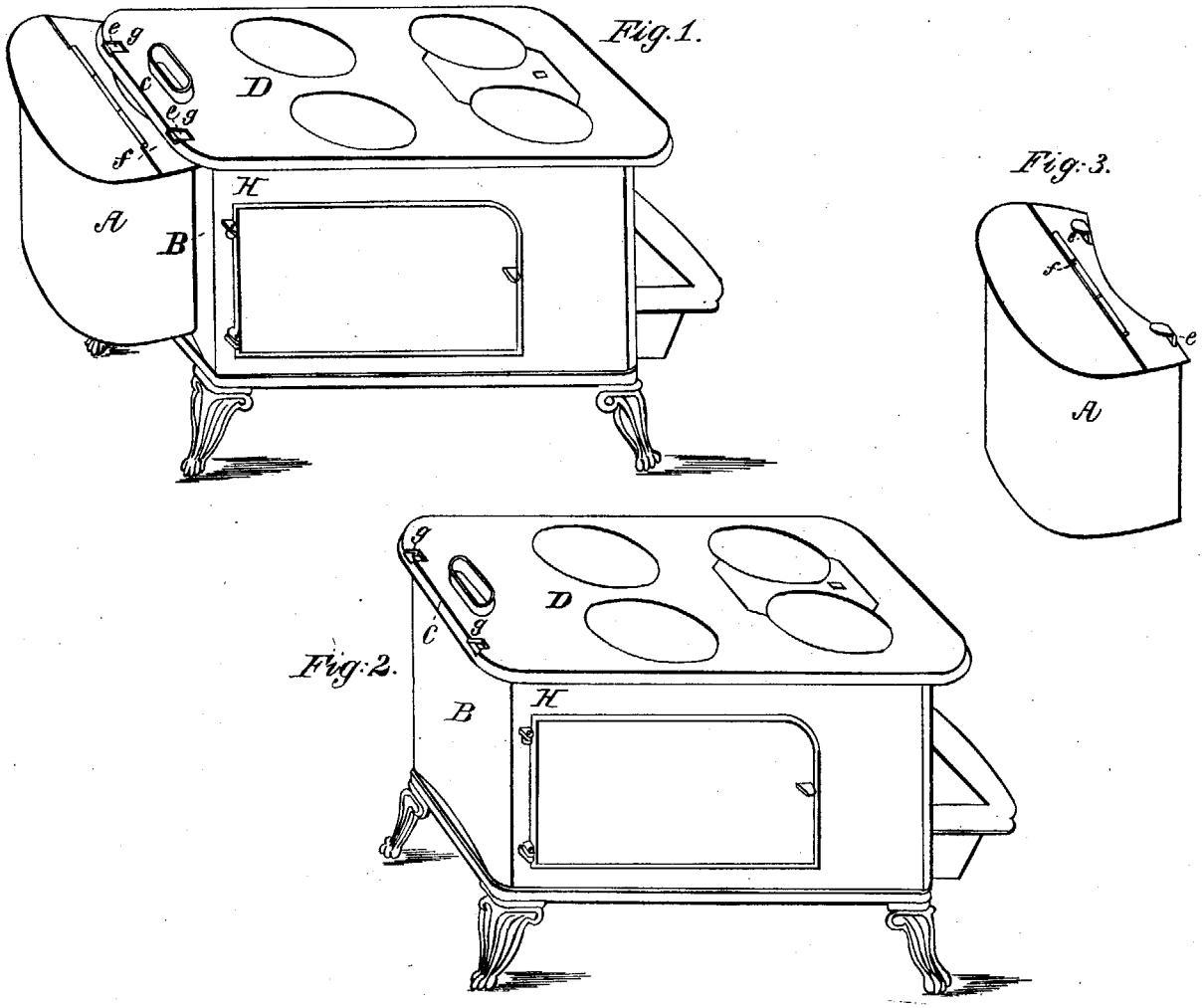
Witnesses.
James Friot.
H. E. Paine.
Inventor.
James R. Hyde.
N. PETERS, Photo-Lithographer, Washington, D. C.

United States Patent Office

DANIEL E. PARIS, OF TROY, NEW YORK, ASSIGNEE OF JAMES R. HYDE.

*Letters Patent No.* 37,966, *dated March* 24, 1863; *reissue No.* 2,688, *dated July* 16, 1867.

COOKING-STOVE.

The Schedule referred to in these Letters Patent and making part of the same.

TO ALL WHOM IT MAY CONCERN:

Be it known that JAMES R. HYDE, of the city of Troy, county of Rensselaer, State of New York, invented new and useful improvements in Reservoirs for Cooking-Stoves, for which Letters Patent were granted him by the United States, March 24, 1863, and which were duly assigned by the said HYDE to DANIEL E. PARIS, of the city of Troy, Rensselaer county, and State of New York; and I do hereby declare that the following is a full and accurate description of the same, reference being had to the accompanying drawings and to letters of reference marked thereon, like letters representing like parts.

Figure 1 is a perspective view of the stove with the reservoir attached.

Figures 2 and 3 show the two separated, with the manner of attachment.

The boiler or reservoir A is attached to and partly or wholly supported by the rear part of the top plate of the stove, with its upright front side adjoining or fitted to the stove back, B, especially at each end of the reservoir, thus preventing the escape of heat, for the water is heated by the products of combustion as they pass down and up the rear flues. The cover to the reservoir is made in two pieces or parts. The back cover is made so that it will stand up perpendicularly, and let the steam, as it condenses on its inner surface, drop back into the reservoir. The front part or top of the reservoir is fastened or attached to the rear end of the top plate of the stove, thus coming up substantially to a level with it, or only a thickness of metal variation. By this means the top surface of the stove is carried backwards to the rear of the pipe collar for a considerable distance, in consequence of this union of the cover, or pieces that cover the reservoir below. The extended top surface thus secured is used as a hot-table or warming-shelf, on which to move articles of food to keep warm, or when cooking too fast. The rear end of the top plate of the stove would not, of itself, be of much service for such purposes, nor would the top of the reservoir be adequate for this purpose, but when the two surfaces are united in one so that they shall substantially correspond with each other, they then become useful as such hot-table or warming-shelf. The usefulness of this feature is not altered by the fact that the two surfaces, the stove top and the reservoir covers, are not exactly on a line with each other; it matters not if one surface be a little below or a little above the other; so long as they are substantially the same they answer all the purposes described just as well as though they were absolutely on a line with each other.

The hot-shelf or table thus formed may be very simple, but it is very useful and convenient also, and it is always accessible when needed, as the reservoir is rarely in use during the time of cooking meals, and this is just the time when the shelf or table is needed. The reservoir is used before meals for washing and preparing articles to cook, and after meals are over for cleaning purposes. Such a place, too, is almost indispensable in a stove with a reservoir behind the back, for it occupies the place usually appropriated to the tin closet or warming-oven. In HYDE'S former patent of June 10, 1862, the reservoir was placed so far below the top surface of the stove that these advantages did not accrue, as neither the spare room on the rear end of the stove top, nor the top cover to the reservoir, was sufficient of itself, and so of the old style of reservoir where its top was raised considerably above the top plate of the stove. The two surfaces, to answer the purpose, must be substantially on a line with each other, neither being far below nor far above the other, and united as one surface.

The invention of fastening the reservoir to the top plate of the stove carries this most useful feature with it, and the top surface thus formed has always been employed, since the invention has been in use, for the double purpose of a cover to the reservoir and a warm-table to use while cooking, on which to set articles to keep warm, as it is out of the way of the regular holes in front, which are generally in use, and the temperature of this place is the same as that of the tin warming-oven. The high or elevated tin cover often used on stove tops will not, as is usually the case, be too hot on this stove, for when placed over this top surface in rear of the oven or pipe collar, the temperature is precisely that desired, the air being slightly moistened by the slowly escaping steam of the water below.

This manner of attaching the reservoir to the rear end of the top plate of the stove is by far the strongest way it can be attached; it is also the simplest, most durable, and much less expensive than to attach it to the upright plates of the stove. The union of the reservoir with the stove is much more close and perfect than when attached in any other way, and when thus attached to the stove top, the weight of the water in the reservoir presses it against the stove back B, giving it greater heating qualities, and secures the further substantial advantage of the hot-table or warming-shelf described above, which cannot be secured if the reservoir is attached in any other practicable way, or placed in any other position. And a further advantage is secured by this mode of attachment: the hot air-chamber between the back plate D of the stove and the front upright side of the reservoir, which must always exist, be it greater or smaller, is entirely covered by the reservoir cover or stove top, or both together, thus preventing a circulation of hot air upward from between the two surfaces which would have a tendency to cool the reservoir and prevent its rapid heating. In consequence of this top covering to said chamber, care in fitting the front of the reservoir to the back plate B need only be had at its front upright corners, and thus the hot air in the chamber so formed cannot escape, and is made to do service in heating the reservoir, thus giving a value and usefulness to said chamber which could not be secured if the reservoir were not attached to the stove top so as to form a union of the two parts sufficiently close to prevent the upward tendency of the accumulating hot air which will commence to gather as soon as the plates begin to heat.

Having thus described the invention of the said JAMES R. HYDE, what is claimed as such, is—

1. Attaching or supporting a reservoir, situated in rear of a diving-flue cooking-stove, to or by the rear part or end of the top plate of the stove, as and for the purposes herein set forth.

2. So attaching the reservoirs to the rear end of the top plate of the stove that its cover, or pieces that form its cover, shall be nearly level with the top surface of the stove, thus practically forming an extension thereof, as and for the purposes herein set forth.

3. The hot air-chamber between the front of the reservoir and the back plate of the stove, closely covered by the top of the reservoir or the top plate of the stove, or both together.

DANIEL E. PARIS.

Witnesses:

CHAS. E. POTTER,

LOUIS POTTER.